(12) United States Patent
Kim

(10) Patent No.: US 9,098,567 B2
(45) Date of Patent: Aug. 4, 2015

(54) METHOD AND APPARATUS FOR DYNAMIC UPDATE OF DOCUMENT RANK SCORE

(75) Inventor: Dong Jin Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 210 days.

(21) Appl. No.: 13/243,711

(22) Filed: Sep. 23, 2011

(65) Prior Publication Data

US 2012/0078920 A1 Mar. 29, 2012

(30) Foreign Application Priority Data

Sep. 27, 2010 (KR) .......................... 10-2010-0093311

(51) Int. Cl.
*G06F 7/00* (2006.01)
*G06F 17/30* (2006.01)

(52) U.S. Cl.
CPC ...... *G06F 17/30634* (2013.01); *G06F 17/3053* (2013.01); *G06F 17/30864* (2013.01)

(58) Field of Classification Search
CPC .................................................. G06F 17/3053
USPC ........................................................... 707/748
See application file for complete search history.

(56) References Cited

U.S. PATENT DOCUMENTS

| 7,958,136 | B1 * | 6/2011 | Curtis et al. | 707/758 |
| 2005/0060311 | A1 * | 3/2005 | Tong et al. | 707/7 |
| 2011/0302176 | A1 * | 12/2011 | Kim et al. | 707/750 |

FOREIGN PATENT DOCUMENTS

KR    10-2010-0093804    8/2010

* cited by examiner

*Primary Examiner* — Ajith Jacob
(74) *Attorney, Agent, or Firm* — Greer Burns & Crain, Ltd

(57) ABSTRACT

Exemplary embodiments of the present invention relate to a method and apparatus for calculating a document rank score of documents in the dynamic World Wide Web (web) environment where documents are continuously added and deleted. The method and apparatus use partial updates to recalculate a document rank score of documents in view of a change, and dynamic updates that reflect a change occurring during calculation of the document rank score.

23 Claims, 8 Drawing Sheets

METHOD AND APPARATUS FOR DYNAMIC UPDATE OF DOCUMENT RANK SCORE

CROSS REFERENCE TO RELATED APPLICATION

This application claims priority from and the benefit of Korean Patent Application No. 10-2010-0093311, filed on Sep. 27, 2010, which is hereby incorporated by reference for all purposes as if fully set forth herein.

BACKGROUND OF THE INVENTION

1. Field of the Invention

Exemplary embodiments of the present invention relate to a method and apparatus for calculating a document rank score. In particular, exemplary embodiments of the present invention relate to a method and apparatus for calculating a document rank score of documents in the dynamic World Wide Web (web) environment in which is documents are continuously added and deleted.

2. Discussion of the Background

A search service providing system (hereinafter, referred to as a 'web search system') may search for documents on the World Wide Web (web) and/or the Internet, may collect documents, and may calculate scores of the collected documents by reflecting contents and link information of the documents. When an inquiry is input by a user, the web search system may provide the user with documents having the highest relevance with the inquiry or a list of such documents.

Billions of documents or more are present on the web. Contents of some of the web documents may be partially changed or deleted. Additionally, new documents may be generated and some old documents may be deleted. Therefore, a status of web documents is continuously changing.

To provide users with high quality web search service, the web search system needs to calculate document scores with respect to the inquiry by continuously reflecting changes in the web, and to promptly reflect the calculated scores in a search result.

The web search system repeats collecting, indexing, link information analysis, and service reflection at regular time intervals. The time intervals may be varied according to search service companies, and are generally at least one week to two weeks.

Therefore, if the web search system is able to reflect a change of documents every time the changed documents are found, and provide users with documents highly related to the inquiry, user satisfaction with respect to the search is service will greatly increase.

The document scores in the web search service may be calculated by a combination of a content-based score of documents and a link-based score. Accordingly, a quick update of the content-based score of documents and the link-based score is necessary to promptly reflect the change of documents in a search result.

SUMMARY OF THE INVENTION

Exemplary embodiments of the present invention provide a partial update method and apparatus that recalculates a document rank score with respect to only a part of documents, which relates to a change, addition, or deletion of contents, when the contents are changed, added, or deleted.

Exemplary embodiments of the present invention also provide a method and apparatus for a dynamic update method and apparatus for calculating a document rank score to which a change, addition, or deletion of contents of a corresponding document is reflected, when the contents are changed, added, or deleted during calculation of the document rank score.

Additional features of the invention will be set forth in the description which follows, and in part will be apparent from the description, or may be learned by practice of the invention.

Exemplary embodiments of the present invention disclose a method that uses a processor to determine a document rank. The method includes calculating, using the processor, a document rank score of a second document based on a first term relationship score of a first document. The first term relationship score being determined is based on a common keyword between the first document and the second document; changing the first term relationship score to a second term relationship score and updating the document rank score of the second document based on the second term relationship score, wherein the first document comprises a link to the second document.

Exemplary embodiments of the present invention also disclose an apparatus to determine a document rank. The apparatus includes a processor, a term relationship score calculating unit, a term relationship score changing unit, and a document rank score calculating unit. The processor controls the term relationship score calculating unit, the term relationship score changing unit, and the document rank score calculating unit. The term relationship score calculating unit calculates a first term relationship score of a first document and a second term relationship score of a second document based on a common keyword between the first document and the second document. The term relationship score changing unit changes the first term relationship score to the second term relationship score. The document rank score calculating unit calculates a document rank score of the second document based on the first term relationship score, and updates the document rank score of the second document based on the second term relationship score.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further is understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
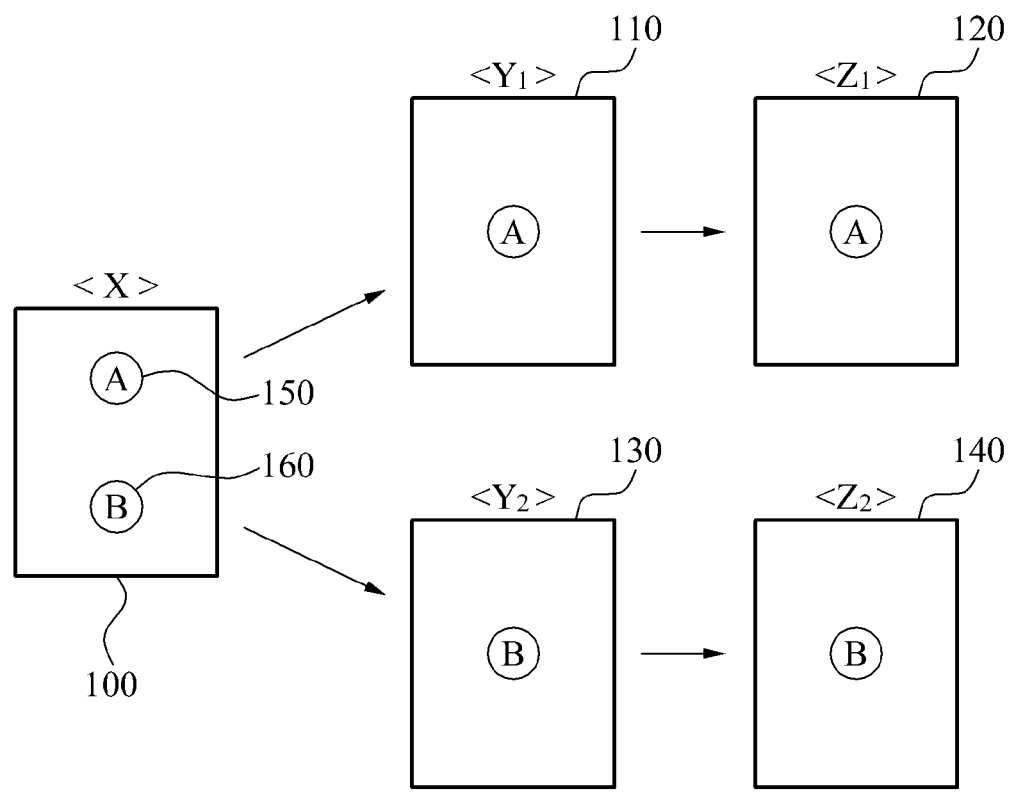
FIG. 1 is a diagram illustrating a method for calculating a document score, according to exemplary embodiments of the present invention.
Figure 1:
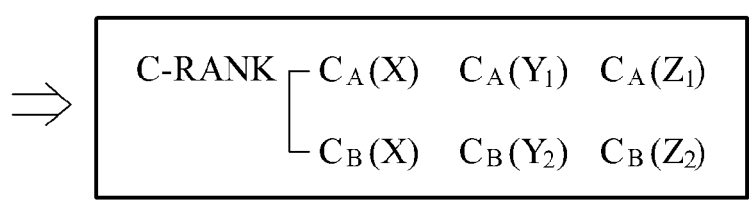

The invention is described more fully hereinafter with reference to the is accompanying drawings, in which exemplary embodiments of the invention are shown. This invention may, however, be embodied in many different forms and should not be construed as being limited to the exemplary embodiments set forth herein. Rather, exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not is preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning For example consistent with their meaning in the context of the relevant art and will not be interpreted in an idealized or overly formal sense unless expressly so defined herein.

A C-rank-based document rank determining method calculates a term relationship score and a contribution score for each term with respect to a document, and determines a ranking of documents based on a combination of the calculated term relationship score and the contribution score. C-rank may be a document score to rank the documents with respect to the term by combining the term relationship score and the contribution score.

The term relationship score is information determined based on contents of a document with respect to a term. The contribution score is information determined based on information on a link of the document with respect to the term. For example, the document rank determining method may calculate the contribution score based on a link of a document, in view of a relationship between the documents linked to each other.

Each document has a C-rank score with respect to each term. A C-rank score of a document <p> with respect to a term "t" may be calculated by combining a term relationship score and a contribution score of the document <p> with respect to the is term "t". Document <p> may refer to any document in the web and/or Internet. Term "t" may refer to any term in a document available on the web and/or Internet. For example, the term "t" may refer to any term having any number or any type of character(s) in any language.

The C-rank-based document rank determining method calculates the C-rank score with respect to terms contained in each document on the web and/or Internet before input of an inquiry by a user. When the inquiry includes at least one term, the document rank determining method calculates the document score with respect to the inquiry, by summing the C-rank scores with respect to the at least one term of each document.

Hereinafter, exemplary embodiments of the present invention will be described in detail with reference to the accompanying drawings.

FIG. 1 is a diagram illustrating a method for calculating a document score, according to exemplary embodiments of the present invention.

FIG. 1 shows a document <Y1> 110, a document <Z1> 120, a document <Y2> 130, and a document <Z2> 140, which may be linked to a document <X> 100. The document <X> 100, the document <Y1> 110, and the document <Z1> 120 may contain a term "A" 150. The document <X> 100, the document <Y2> 130, and the document <Z2> 140 may contain a term "B" 160. The terms "A" and "B" may each refer to any term having any number or any type of character(s) in any language. Document <X> 100, document <Y1> 110, document <Z1> 120, document <Y2> 130, and document <Z2> 140 may be documents provided by the web.

The term "A" 150 is a common keyword of the document <X> 100, the is document <Y1> 110, and the document <Z1> 120. The term "B" 160 is a common keyword of the document <X> 100, the document <Y2> 130, and the document <Z2> 140. The common keyword refers to a keyword contained in documents linked to each other. Any two or more linked documents may include at least one common keyword.

The term "A" 150 and the term "B" 160 may be contained in an inquiry input by the user.

The document rank determining method may determine ranking of the documents with respect to each term, and may determine the ranking of the documents by combining contents and link information of the documents.

In particular, the method may determine the ranking of the documents by combining a term relationship score of a document with respect to each of at least one term contained in the document, with a contribution coefficient indicating utility of another document that also contains the at least one term.

For example, a few basic concepts may be explained, as follows, prior to determining the ranking of the documents.

(1) Reference of Important Document

In a document in the web and/or Internet, information to be provided to a user may include text. Details or additional information related to the text may be provided via a connection (e.g., link) to another document on the web. For example, the document <Y1> 110 and the document <Y2> 130, may have a similar theme as a document, such as document <X> 100, including at least one link, and may be connected via the at least one link. In some cases, the documents connected by the at least one link may be documents containing a supplement to details or specifications about the term "A" 150 and/or the term "B" 160. In some cases, the documents connected by the at least one link may be documents having no clear relationship with the document including the at least one link. For example, advertisements not related to contents of the document including the at least one link may be connected to the document via a link.

Contents of a document may be an essential factor for evaluation of a quality of the document. A user expects a search result to provide information on documents highly-related to a search inquiry input by the user. The document rank determining method or a document rank determining apparatus may provide information on and a connection to an essential document contributing to a text of a document.

According to the exemplary embodiments of the present invention, a document rank determining apparatus may determine documents meeting the following conditions as an essential document: i) a document on the web having a high term relationship score with respect to a specific term; ii) a document linked to a document having a term relationship score with respect to a specific term; and iii) a document linked to a document using information from the document having a high term relationship score with respect to a specific term.

(2) Contribution Score of Documents Linked to Each Other

A contribution score of two documents linked to each other, for example, the documents <Y1> 110 and <Y2> 130, with respect to the document (e.g., document <X> 100) including the link may be determined based on the term relationship score between the two documents with respect to a specific inquiry.

If the term relationship score of the two documents with respect to the is inquiry is high, the documents linked to each other may contribute greatly to the quality of the document including the link. However, when the documents linked to each other have a low relationship with the inquiry, the documents linked to each other may not contribute meaningfully to the quality of the document including the link.

(3) User Interests According to Ranking

In providing a search result, a relative ranking of searched documents is also important. Users may want the most search inquiry-relevant information to be displayed on the first page of a search result. When the document ranking determining apparatus outputs, for example, a first to a tenth ranking of documents, users may pay particular attention to the highly-ranked documents, for example, the first-ranked document, while not paying as much attention to lower ranked documents, for example, documents ranked between 200th and 300th.

Accordingly, the document rank determining apparatus may more accurately determine the relative ranking of high-ranking documents compared to the relative ranking of low-ranking documents. For example, by determining the relative ranking of high-ranking documents more accurately, the users may be more satisfied with the search result. Therefore, determination of the relative ranking of documents does not have to be performed with respect to numerous documents. Consequently, resources required for producing a search result may be reduced.

Based on the foregoing, the document rank determining method and/or apparatus may calculate the term relationship score and the contribution score of the document <X> 100, the document <Y1> 110, and the document <Z1> 120 with respect to the term "A" 150, and may calculate a C-rank score for determining a ranking among is the documents with respect to the term "A" 150 by combining the term relationship score and the contribution score.

In addition, the document rank determining method and/or apparatus may calculate the term relationship score and the contribution score of the document <X> 100, the document <Y2> 130, and the document <Z2> 140 with respect to the term "B", and may calculate a C-rank score for determining a ranking among the documents with respect to the term "B" 160 by combining the term relationship score and the contribution score. A final ranking (CR_(X)) may be determined by arranging the term relationship scores determined with respect to a document and a term pair in an ascending or descending order.

The C-rank score $CR_t(P)$ of a document <p> with respect to a term "t" may be calculated using Equation 1 as noted below.

$$CR_t(p) = \lambda R_t(p) + (1-\lambda)C_t(p), 0 \leq \lambda \leq 1 \quad \text{[Equation 1]}$$

wherein, $R_t(p)$ denotes the term relationship score of the document <p> with respect to the term "t", $C_t(p)$ denotes the contribution score of the document <p> related to the term "t" with respect to other documents, and λ denotes a weight of the term relationship score and the contribution score.

As noted above, a C-rank score $CR_t(p)$ of the document <p> with respect to the term "t" may be a sum of the term relationship score $R_t(p)$ of the document <p> with respect to the term "t" and the contribution score $C_t(p)$ of other documents related to the term "t".

Hereinafter, a calculation method of the contribution score $C_t(p)$ will be is described in detail with reference to FIG. 2.

Figure 2:
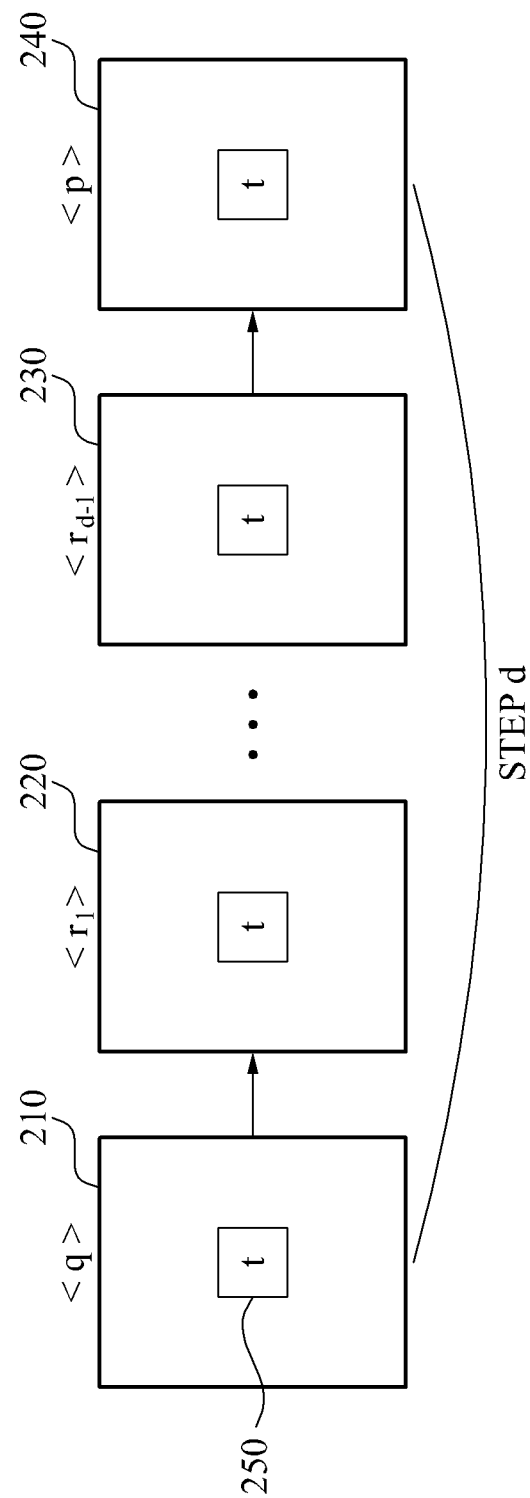
FIG. 2 is a diagram illustrating a method for calculating a contribution coefficient of a document, with respect to a common keyword, according to exemplary embodiments of the present invention.

FIG. 2 is a diagram illustrating a method for calculating a contribution coefficient of a document, with respect to a common keyword, according to exemplary embodiments of the present invention.

A contribution coefficient may refer to a coefficient of contribution of a second document to contents of a first document. The contribution coefficient of the first document with respect to the second document is determined with respect to a common keyword of the first document and the second document.

In a set of documents shown in FIG. 2, a document <q> 210 reaches a document <p> 240 through "d" number of steps of a link path. "d" may be any whole number greater than one. A set of documents corresponding to the link path is denoted as D(p,d). The document <p> 240 may correspond to a first document, and each of the documents linked to the document <p> 240 may correspond to a second document.

The contribution score $C_t(p)$ of the document <p> with respect to the term "t" may be calculated by using Equation 2 below.

$$C_t(p) = \sum_d \sum_{q \in D(p,d)} C_t(p,q) \quad \text{[Equation 2]}$$
$$= \sum_d \sum_{q \in D(p,d)} \alpha_t^d(p,q) R_t(q)$$

As aforementioned, D(p,d) denotes the set of starting documents of a path to reach the document <p> along respectively different "d" number of links, and "t" 250 denotes a term.

In addition, $$\sum_d \sum_{q \in D(p,d)} \alpha_t^d(p, q) R_t(q)$$

denotes the contribution score of the is document <p> 240, which is the first document, with respect to the document <q> 210, which is the second document, with respect to the term "t" 250.

$\alpha_t^d(p,q)$ denotes the contribution coefficient of the document <p> 240 contributing to the document <q> 210.

$R_t(q)$ denotes a content score of the document <q> 210 with respect to the term "t" 250.

As shown in Equation 2, the contribution score of the document <p> 240 may be calculated by applying the content score of the document <q> 210 to the contribution coefficient of the document <p> 240 with respect to the document <q> 210.

As shown in FIG. 2, when there is a link path including a plurality of steps of links from the second document <q> 210 to the first document <p> 240, the contribution coefficient of the first document <p> 240 with respect to the second document <q> 210 may be determined using contribution coefficients of a document <$r_1$> 220 to a document <$r_{d-1}$> 230, which are documents corresponding to the link path.

The contribution coefficient may be determined according to Equation 3 below.

$$\alpha_t^d(p, q) = \alpha_t^1(p, r_{d-1}) \times \prod_{i=1}^{d-2} \alpha_t^1(r_{i+1}, r_i) \times \alpha_t^1(r_1, q),$$ [Equation 3]

for $d > 1$

Equation 3 is noted in view of the link path ($q \to r_1 \to r_2 \to \ldots r_{d-1} \to p$) from document <q> 210 to document <p> 240 through "d" number of steps of the link path. Referring to Equation 3, the contribution coefficient $\alpha_t^d(p,q)$ of the first is document <p> 240 with respect to the second document <q> 210 may be determined by the contribution coefficients of the documents (e.g., <$r_1$> 220 to <$r_{d-1}$> 230) corresponding to the link path.

In addition, the contribution coefficients of the documents corresponding to the link path may be determined using contribution coefficients of respective neighboring documents on the link path, for example, a contribution coefficient of a document <$r_2$> with respect to a document <$r_1$> in a link $r_1 \to r_2$.

When the first document and the second document are connected by a single link, the contribution coefficient of the first document with respect to the second document may be determined by the content score of the first document, the content score of the second document, and a content score of a third document corresponding to an outlink of the second document.

When a first document and a second document are connected by a single link, the contribution coefficient of the first document with respect to the second document may be determined by Equation 4 below.

$$\alpha_t^1(p, q) = \frac{R_t(p)}{R_t(q) + \sum_{r \in outlink(q)} R_t(r)}$$ [Equation 4]

For example, the contribution coefficient of the first document <p> 240 with respect to the second document <q> 210 may be proportional to the content score of the first document <p> 240, and inversely proportional to the content score of the second document <q> 210, and a third document. As a number of the third documents corresponding to the outlink of the second document <q> 210 increases, the contribution is coefficient of the first document <p> 240 with respect to the second document <q> 210 may decrease.

Additionally, when there is no existing link $q \to p$, $\alpha_t^1(p,q)=0$.

Referring to Equation 4, if the first document <p> 240 has a higher relationship with the term "t" 250 than the second document <q> 210 (e.g., $R_t(p)$ is greater than $R_t(q)$), the contribution coefficient $\alpha_t^1(p,q)$ of the first document <p> 240 with respect to the second document <q> 210 may increase. Conversely, if the second document <q> 210 has a higher relationship with the term "t" 250 than the first document <p> 240 (e.g., $R_t(q)$ is greater than $R_t(p)$), then the contribution coefficient $\alpha_t^1(p,q)$ of the first document <p> 240 with respect to the second document <q> 210 may decrease.

Additionally, as the number of the third documents connected to the second document <q> 210 by outlinks increases to supplement information on the term "t" 250 contained in the second document <q> 210 (e.g., a number of the documents <$r_1$>, <$r_{d-1}$> increases), the contribution coefficient $\alpha_t^1(p,q)$ of the first document <p> 240 with respect to the second document <q> 210 may decrease. The third document may refer to all the documents connected through links that provide supplemental information on the term "t" 250 in the second document <q> 210.

For example, when a document <p>, a document <q>, and a document <r> are connected by a link $r \to q \to p$, the contribution score of the document <q> with respect to the document <r> is $\alpha_t^1(q,r) R_t(r)$. The contribution scores of the document <p> with respect to the document <q> and the document <r> are $\alpha_t^1(p,q) R_t(q)$ and $\alpha_t^2(p,r) R_t(r)$, respectively. The contribution scores of the document <p> with respect to the document <r> ($\alpha_t^2(p,r) R_t(r)$) is $\alpha_t^1(q,r) \alpha_t^1(p,q) R_t(r)$.

Accordingly, the contribution score of the document <p> with respect to the document <q> and the document <r> is $(\alpha_t^1(q,r) R_t(r) + R_t(q)) \times \alpha_t^1(p,q)$. Therefore, the contribution score $(\alpha_t^1(q,r) R_t(r) + R_t(q)) \times \alpha_t^1(p,q)$ of the document <p> with respect to the document <q> and higher-ranking documents associated with document <q>, such as the document <r>, may be obtained from the contribution score $\alpha_t^1(q,r)$ of the document <q> with respect to the document <r>, and from the content score $R_t(r)$ of the document <q>.

Figure 3:
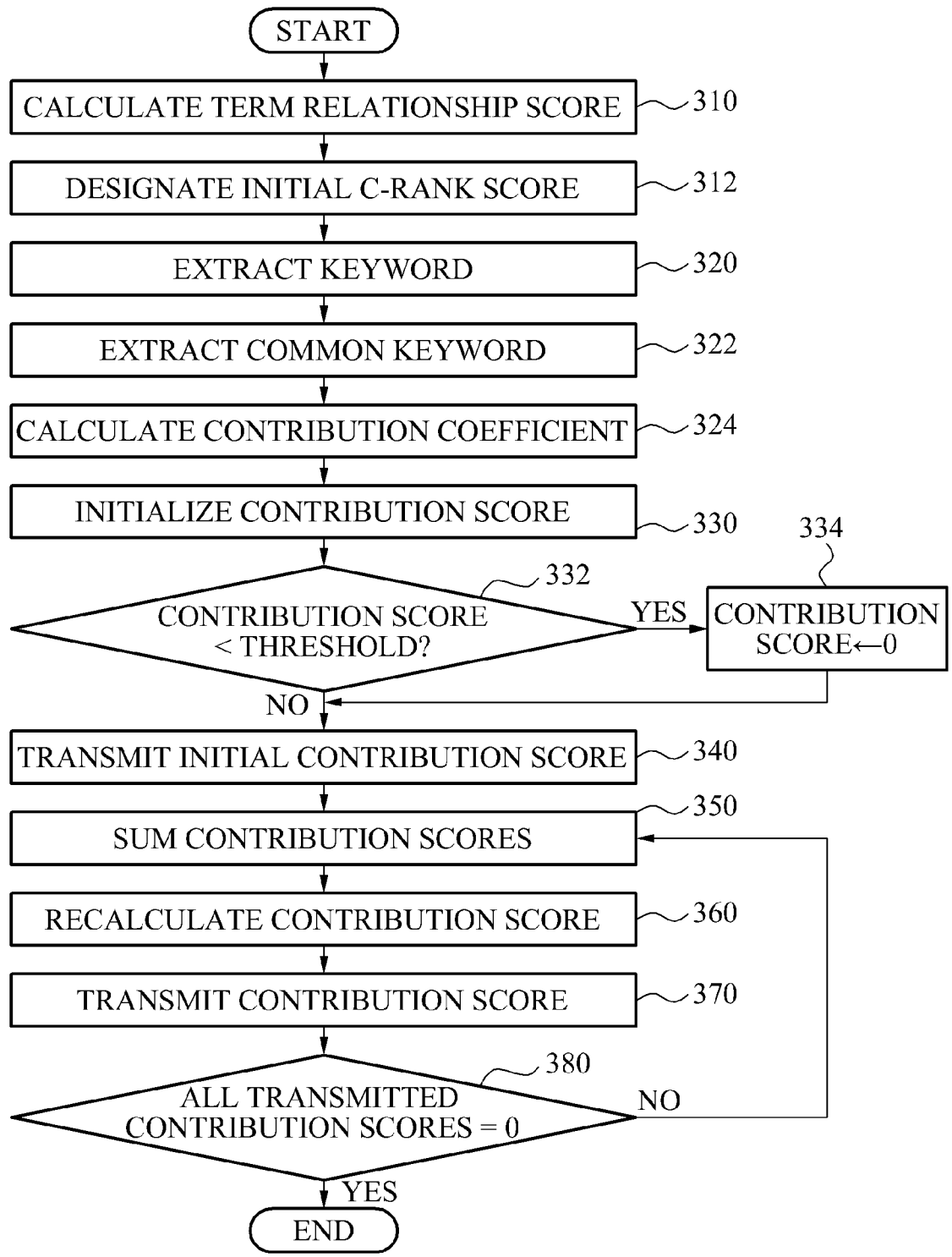
FIG. 3 is a flowchart illustrating a method for determining a document rank, according to exemplary embodiments of the present invention.

FIG. 3 is a flowchart illustrating a method for determining a document rank, according to exemplary embodiments of the present invention.

The document rank determining method according to exemplary embodiments of the present invention may include initializing operations 310 to 330 and score transmitting operations 340 to 380.

In operation 310, the term relationship score $R_t(p)$ of a document <p> with respect to each term "t" contained in the document <p> may be calculated.

In operation 312, $\lambda R_t(p)$ may be designated as an initial C-rank score of is the document <p> with respect to the term "t".

In operation 320, keywords of the document <p> may be extracted.

In operation 322, common keywords may be extracted between document <p> and document <q>, which is associated with document <p> by a link.

In operation 324, a contribution coefficient $\alpha_t^1(q,p)$ between the document <q> and the document <p> with respect to each of the common keywords (e.g., "t") may be calculated.

$T_t(p,q)$ denotes a contribution score with respect to a common keyword "t".

In operation 330, $T_t(p,q)$ may be initialized to $\alpha_t^1(q,p)R_t(p)$.

In operation 332, $T_t(p,q)$ may be compared with a predetermined threshold value. When $T_t(p,q)$ is less than the predetermined threshold value, operation 334 may be performed. When $T_t(p,q)$ is not less than the predetermined threshold value, operation 340 may be performed.

In operation 334, $T_t(p,q)$ may be initialized to zero and operation 340 for score transmission may be performed.

In operation 340, the contribution score $T_t(p,q)$ calculated in the initialized operation may be transmitted to a computer or server hosting document <q> from a computer or server hosting document <p>. The computer or server hosting document <p> and document <q> may be the same or may be different. For example, the computer or server hosting document <p> and/or document <q> may be a document rank is determining apparatus 800, as described hereinbelow, and may include a controlling unit to control transmission of documents from the computer or server hosting document <q> to the computer or server hosting document <p>, and vice versa.

In operation 350, the computer or server hosting document <q> may receive the contribution score $T_t(p,q)$, and may add $T_t(p,q)(1-\lambda)$ to its C-rank score $CR_t(q)$.

In operation 360, the computer or server hosting document <p> may recalculate the contribution score $T_t(p,q)$.

New $T_t(p,q)$ may be calculated by multiplying the transmitted contribution score by the contribution coefficient $\alpha_t^1(q,p)$. When a contribution path score of the transmitted contribution score is equal to a maximum contribution path length, $T_t(p,q)$ may be designated as zero.

In operation 370, the computer or server hosting document <p> may transmit $T_t(p,q)$ to the computer or server hosting document <q>.

In operation 380, when the contribution scores transmitted with respect to all the documents are zero, the process is ended. If the contribution scores transmitted with respect to all the documents is not zero, operation 350 may be repeated.

Figure 4:
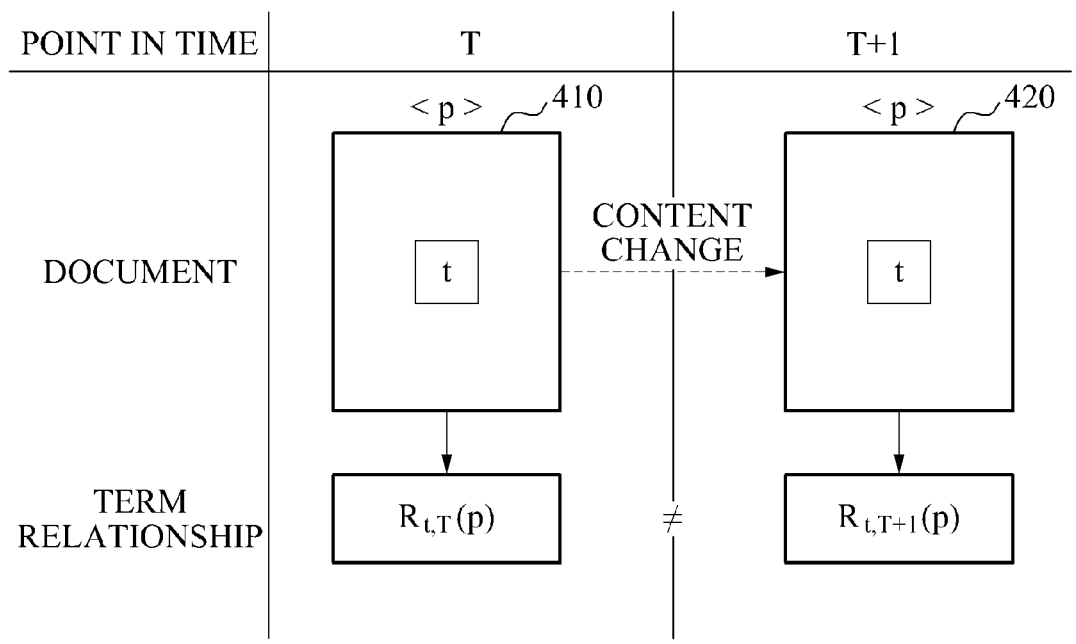
FIG. 4 is a diagram illustrating change in a term relationship score, according to exemplary embodiments of the present invention.

FIG. 4 is a diagram illustrating change in a term relationship score, according to exemplary embodiments of the present invention.

The term relationship score $R_t(p)$ of the document <p> with respect to the term "t" may be changed, for example, due to change in contents of the document <p>. The term relationship score $R_t(p)$ may be dynamically updated. Since such a change occurs at a particular point of time, a factor indicating a point in time with respect to the term relationship score $R_t(p)$ needs to be additionally considered.

The document rank determining method described with reference to FIG. 1, FIG. 2, and FIG. 3 may be considered a static calculation method; however, a point in time T may be added to a notation used in the static calculation method. T may be any positive number including zero.

$R_{t,T}(p)$ denotes a term relationship score of the document <p> with respect to the term "t" at the point in time T.

$C_{t,T}(p)$ denotes a contribution score of the document <p> with respect to the term "t" at the point in time T.

$\alpha_{t,T}^1(p,q)$ denotes a contribution coefficient of a link q p at the point in time T.

$\alpha_{t,T}^d(p,q)$ denotes a contribution coefficient of a path including "d" number of links connecting the document <q> with the document <p> at the point in time T.

$CR_{t,T}(p)$ denotes a C-rank score of the document <p> with respect to the term "t" at the point in time T.

In FIG. 4, contents of a document <p> 410 are changed at a point in time T+1, whereby the document <p> may become a document <p> 420. The term relationship score of the document <p> 410 with respect to the term "t" is $R_{t,T}(p)$ at time "T", and the term relationship score of the document <p> 420 with respect to the term "t" is $R_{t,T+1}(p)$ at time T+1. The term relationship score may be dynamically changed by the change in contents of the document.

When dynamic change of the term relationship score $R_{t,T}(p)$ is achieved, $\alpha_{t,T}^1(p,q)$ and $\alpha_{t,T}^d(p,q)$ and may also be dynamically changed. Accordingly, $CR_{t,T}(p)$ needs to be updated to reflect the dynamic change.

When a link structure between documents <p> and <q> is provided, $C_{t,T}(p)$, $\alpha_{t,T}^1(p,q)$, $\alpha_{t,T}^d(p,q)$ and $CR_{t,T}(p)$ may be calculated using the term relationship score $R_{t,T}(p)$ and static calculation method mentioned earlier. Hereinafter, it will be presumed that the C-rank score $CR_{t,0}(p)$ of the document <p> when time T is zero is already calculated by the static calculating method.

Two types of update of the C-rank store according to the change of the term relationship score may be performed.

The first type of update is a partial update that may be performed when the term relationship score is changed after calculation of the C-rank score is complete.

It is presumed that the link structure between the documents is fixed.

When the term relationship score $R_{t,T}(p)$ of the document <p> is newly provided, the C-rank score of documents of which the term relationship score or the contribution score with respect to other documents is changed by the new term relationship score $R_{t,T}(p)$ needs to be updated.

For example, when the term relationship score $R_{t,T+1}(p)$ of the document <p> is newly provided at time T+1, $CR_{t,T+1}(p)$ of the document <p> is calculated by the above-noted score transmission method. $CR_{t,T+1}(p)$ is calculated with respect to document <p> of which the term relationship score or the contribution score with respect to other documents is changed. This calculation is referred to as a 'partial update'.

The second type of update is a dynamic update that may be performed when the term relationship score is changed during calculation of the C-rank score.

As noted above, it is presumed that the link structure between the documents is fixed.

The term relationship score $R_{t,T+2}(p)$ of the document <p> with respect to the term "t" may be newly provided while the C-rank score $CR_{t,T+1}(p)$ of the document <p> is being calculated using the term relationship score $R_{t,T}(p)$ and the link structure between the documents. In this case, a final C-rank score $CR_{t,T+2}(p)$ may be calculated by reflecting the new term relationship score $R_{t,T+2}(p)$.

For example, according to the dynamic update of the term relationship score, when the new term relationship score $R_{t,T+2}(p)$ of the document <p> with respect to the term "t" is provided during calculation of the C-rank score $CR_{t,T+1}(p)$ of the document <p>, $CR_{t,T+2}(p)$ may be calculated by the score transmission method reflecting the term relationship score $R_{t,T+2}(p)$ in a state where calculation of $CR_{t,T+1}(p)$ is incomplete. $CR_{t,T+2}(p)$ may be calculated only with respect to documents of which the term relationship score or the contribution score with respect to is other documents is changed. Such calculation is referred to as the 'dynamic update'.

Hereinafter, relationships between time T, the C-rank score, and the contribution score will be described.

According to Equation 1, the C-rank score of the document <p> with respect to the term "t" is a weighted sum of the term relationship score of the document <p> with respect to the term "t" and the contribution score of the document <p> with respect to other documents.

Assuming that the term relationship score, the contribution score, and the C-rank score of the document <p> at the point in time T are calculated, the C-rank score of the document <p> with respect to the term "t" at the point in time T+1 may be expressed according to Equation 5 below.

$$CR_{t,T+1}(p) = CR_{t,T}(p) + \lambda(R_{t,T+1}(p) - R_{t,T}(p)) + (1-\lambda)(C_{t,T+1}(p) - C_{t,T}(p))$$ [Equation 5]

wherein $R_{t,T+1}(p)$ is provided according to a change of the document <p>. Therefore, when calculation of the contribution score $C_{t,T+1}(p)$ of the document <p> is available by partial update or dynamic update, the C-rank score $CR_{t,T+1}(p)$ of the document <p> at the point in time T+1 may be calculated.

According to the partial update and the dynamic update, when the contents of a document are changed or the document is deleted or added, the C-rank score may be updated only with respect to documents of which the C-rank score is influenced by the change, deletion, or addition of the document.

As a result, the partial update and the dynamic update may be able to promptly reflect the web environment, which is dynamically changing.

Additionally, since documents are continuously added and deleted in an environment, such as the web, where the document ranking is necessary, the C-rank score calculated by the partial update or the dynamic update may more effectively and accurately reflect document ranking than the C-rank score calculated by the static calculation method.

Figure 5:
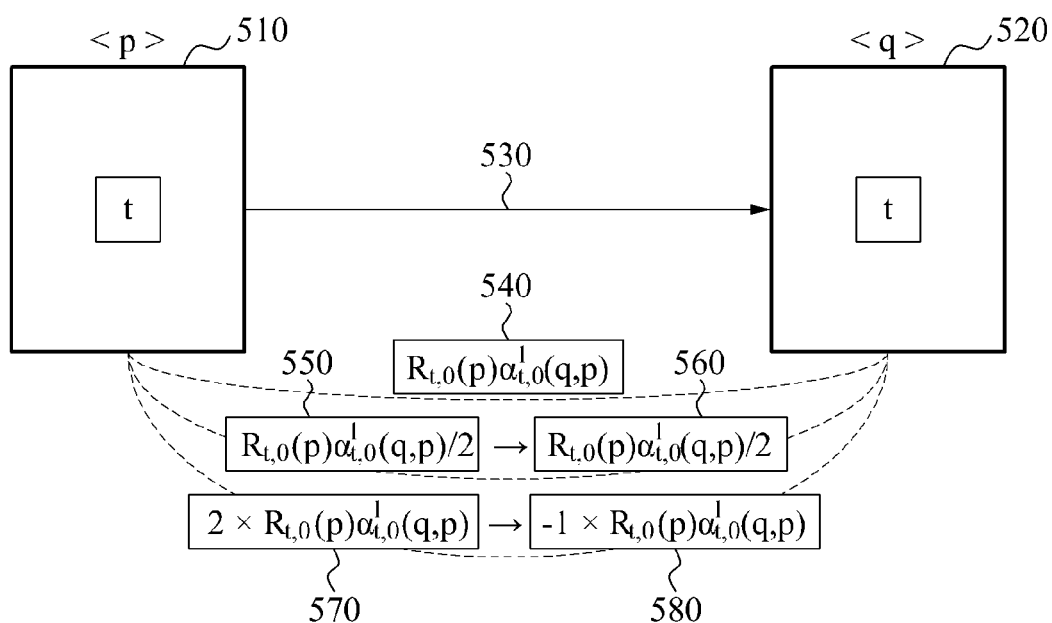
FIG. 5 is a diagram illustrating divisional transmission characteristics of a contribution score, according to exemplary embodiments of the present invention.

FIG. 5 is a diagram illustrating divisional transmission characteristics of a contribution score, according to exemplary embodiments of the present invention.

Calculation of a contribution score $C_{t,0}(P)$ of the document <p> when time T is zero will be described according to the static calculation method.

As aforementioned, each of the documents may generate the contribution score by multiplying the term relationship score thereof by the contribution coefficient, and the generated contribution scores may be transmitted to computers or servers hosting documents connected via an outlink.

Each of the computers or servers that receive the contribution score may multiply the transmitted contribution score by the contribution coefficient of the outlink, and may transmit the multiplication result to documents connected via the outlink.

Accordingly, the contribution score may be generated by multiplying the contribution coefficient of the path by the term relationship score of the document contributing the contribution score.

Generation and transmission of the contribution score may be repeated is until the contribution score to be transmitted is at most a predetermined value or until transmission of the contribution score is performed a predetermined number of times.

In FIG. 5, a contribution score 540 transmitted from a document <p> 510 to a document <q> 520 through a link p→q 530 may be $R_{t,0}(p)\alpha_{t,0}^{1}(q,p)$ according to Equation 3.

One half 550 of the contribution score 540 may be transmitted from the computer or server hosting document <p> 510 to the computer or server hosting document <q> 520 during a first repetition operation, for example, the score transmission operation including operations 340 to 380 of FIG. 3. Additionally, the computer or server hosting document <p> 510 may transmit another half 560 during a second repetition operation.

The score transmitted in each repetition operation is $R_{t,0}(p)\alpha_{t,0}(q,p)/2$. Therefore, a sum of the contribution scores transmitted from the document <p> 510 to the document <q> 520 may be $R_{t,0}(p)\alpha_{t,0}^{1}(q,p)$.

Thus, although the computer or server hosting document <p> 510 may transmit the contribution score 540 divisionally, the contribution score 540 of the document <q> 520 with respect to the document <p> 510 may remain constant when the repetition operations are completed.

Accordingly, in the static calculation method, although the contribution score generated by the term relationship score of the document <p> or the contribution score transmitted to the document <p> can be divided such that the divided contribution scores sum to the original contribution score, the total contribution score transmitted to each document may constantly be maintained after the static calculation method is is complete.

In some cases, the computer or server hosting document <p> 510 may transmit a contribution score 570 that is double the calculated contribution score 540 to the computer or server hosting the document <q> 520 in a first repetition operation, and a contribution score 580 that is a negative (e.g., multiplied by −1) of the calculated contribution score 540 in a second repetition operation.

For example, the contribution score 570 transmitted in the first repetition operation is $2 \times R_{t,0}(p)\alpha_{t,0}^{1}(q,p)$, and the contribution score 580 transmitted in the second repetition operation is $-1 \times R_{t,0}(p)\alpha_{t,0}^{1}(q,p)$. Accordingly, the sum of the contribution scores transmitted from the document <p> 510 to the document <q> 520 is $R_{t,0}(p)\alpha_{t,0}^{1}(q,p)$.

Also, the contribution scores transmitted to the computer or server hosting document <q> 520 sum to $R_{t,0}(p)\alpha_{t,0}^{1}(q,p)$ after the repetition operations are completed.

When the computer or server hosting document <p> 510 transmits an excessively high contribution score to the computer or server hosting document <q> 520 and then transmits a minus contribution score for offsetting the previous contribution score to the computer or server hosting document <q> 520, the total contribution score of the document <p> 510 with respect to the document <q> 520 may be maintained when the repetition operations are completed.

Additionally, even when the computer or server hosting document <p> may divisionally transmit a contribution score transmitted from a computer or server is hosting document <o> to the document <q> in a link structure o→p→q, the total contribution score of the document <p> with respect to the document <o> may constantly be maintained.

As described in the foregoing, although the contribution score is transmitted, whether divided into positive numbers or negative numbers, if the sum total of the divided contribution scores is equal to the original contribution score, the same result may be derived as if the original contribution score is transmitted. Such characteristics of the contribution score will be referred to as 'divisional transmission characteristics'.

The partial update and the dynamic update may be considered as intermediate processes of the static calculation, using the divisional transmission characteristics.

Problem of Partial Update

If the term relationship score $R_{t,T}(o)$ of each document <p> is provided and the contribution score $C_{t,T}(p)$ of the document <p> is calculated, change of the term relationship score $R_{t,T}(p)$ into $R_{t,T+1}(p)$ can be described as follows.

The term relationship score provided to the document <p> is $R_{t,T+1}(p)$. When obtaining $C_{t,T+1}(p)$, $C_{t,T}(p)$ may be calculated by transmitting only a part of the contribution score, that is, $R_{t,T}(p)$ from each document.

A first contribution score denotes a contribution score to be transmitted from the computer or server hosting document <p> to a computer or server hosting a document associated with an outlink of document <p> when the term relationship score is of the document <p> is $R_{t,T+1}(p)$. A second contribution score denotes a contribution score to be transmitted from the document <p> to the computer or server hosting the document associated with the outlink when the term relationship score of the document <p> is $R_{t,T}(p)$. A difference between the first contribution score and the second contribution score may be referred to as an additional contribution score.

According to the divisional transmission characteristics, when $C_{t,T}(p)$ is calculated, $C_{t,T+1}(p)$ may be calculated by additional transmission of the contribution score not yet transmitted.

The contribution score $\alpha T_{t,T}(p,q)$ to be additionally transmitted from the document <p> may be calculated by Equation 6 below.

$$\Delta T_{t,T}(p, q) = R_{t,T+1}(p)\alpha^1_{t,T+1}(q, p) - \\ R_{t,T}(p)\alpha^1_{t,T}(q, p) + T_{t,T}(p, q) \times \left( \frac{\alpha^1_{t,T+1}(q, p)}{\alpha^1_{t,T}(q, p)} - 1 \right)$$ [Equation 6]

wherein $T^{t,T}(p,q)$ denotes an accumulated contribution score that the computer or server hosting document <p> receives from computers or servers hosting other documents and transmits to the computer or server hosting document <q>. However, transmission of the contribution score may be stopped when the contribution score to be transmitted next is smaller than a predetermined threshold value or when a transmission path length is greater than a maximum transmission path length during the repetition operation. $T_{t,T}(p,q)$ and $C_{t,T}(p) \times \alpha_{t,T}^1(q,p)$ may have different values.

Problem of Dynamic Update

The score transmission for calculating the contribution score $C_{t,T}(P)$ may be repeated in a state where the term relationship scores $R_{t,T}(p)$ and $\alpha_{t,T}^1(q,p)$ of the document <p> are provided.

Divisional transmission does not require calculation of $C_{t,T}(p)$ to be complete. In other words, according to divisional transmission characteristics, although the score may additionally be transmitted during calculation of $C_{t,T}(p)$, a new contribution score $C_{t,T+1}(p)$ according to a new term relationship score $R_{t,T+1}(p)$ may be correctly calculated using $C_{t,T}(p)$ which is being calculated.

Therefore, when the new term relationship score $R_{t,T+1}(p)$ of the document <p> is provided, the contribution score $C_{t,T+1}(p)$ of each document may be calculated by following steps 1) to 4).

1) The score transmission repetition is stopped.
2) The contribution coefficient of each link is updated.
3) Each document transmits the additional contribution score calculated by Equation 6.
4) The score transmission repetition is restarted.

Figure 6:
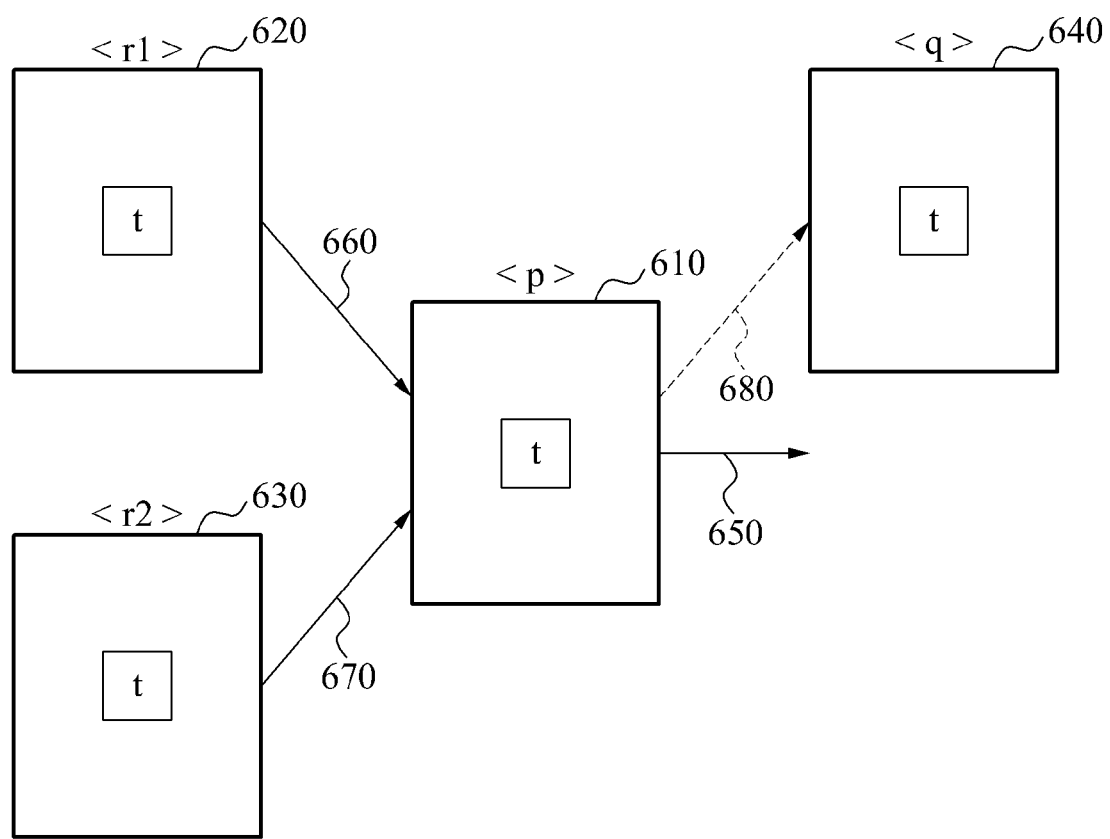
FIG. 6 is a diagram illustrating a document as a target of C-rank score update, according to exemplary embodiments of the present invention.

FIG. 6 is a diagram illustrating a document as a target of C-rank score update, according to exemplary embodiments of the present invention.

When a term relationship score of a document <p> 610 is updated, links in is which a contribution coefficient is changed include an outlink 650 associated with document <p> 610 and outlinks 660 and 670 of documents 620 and 630 associated with the document <p> 610.

According to Equation 6, documents causing no change in the term relationship score and in the contribution coefficient of the outlinks have no contribution score to be additionally transmitted. The documents hosted by computers or servers that additionally transmit the contribution score are limited to documents of which the term relationship score is changed and documents directed, through a link, to the documents of which the term relationship score is changed. Such documents are referred to as additional contribution score transmitting documents.

A case in which a new link p→q 680 is added at time T+1 according to a change in the contents of the document <p> will be described.

Addition of the link 680 may be interpreted as a change of the term relationship score of the document <p> 610 or the document <q> 640, thereby changing $\alpha_{t,T}^1(q,p)=0$ into $\alpha_{t,T+1}^1(q,p)>0$ A case in which the link p→q 680 is deleted at time T+1 according to the change in the contents of the document <p> will be described.

Deletion of the link 680 may be interpreted as a change from $\alpha_{t,T}^1(q,p)>0$ to $\alpha_{t,T+1}^1(q,p)=0$ Therefore, partial update and dynamic update of the C-rank score according to addition and deletion of a link may be performed in the same manner as the dynamic update of the term relationship score described in the foregoing.

Addition of a new document may be interpreted as text being added to a document already produced, of which all term relationship scores are zero due to absence of contents, thereby causing a change in the term relationship score.

Deletion of an existing document may occur when the contents of the document are deleted so that all the term relationship scores become zero.

Accordingly, the dynamic update according to addition and deletion of a document may be performed in the same manner as the dynamic update according to a change in the term relationship score of the document.

Figure 7:
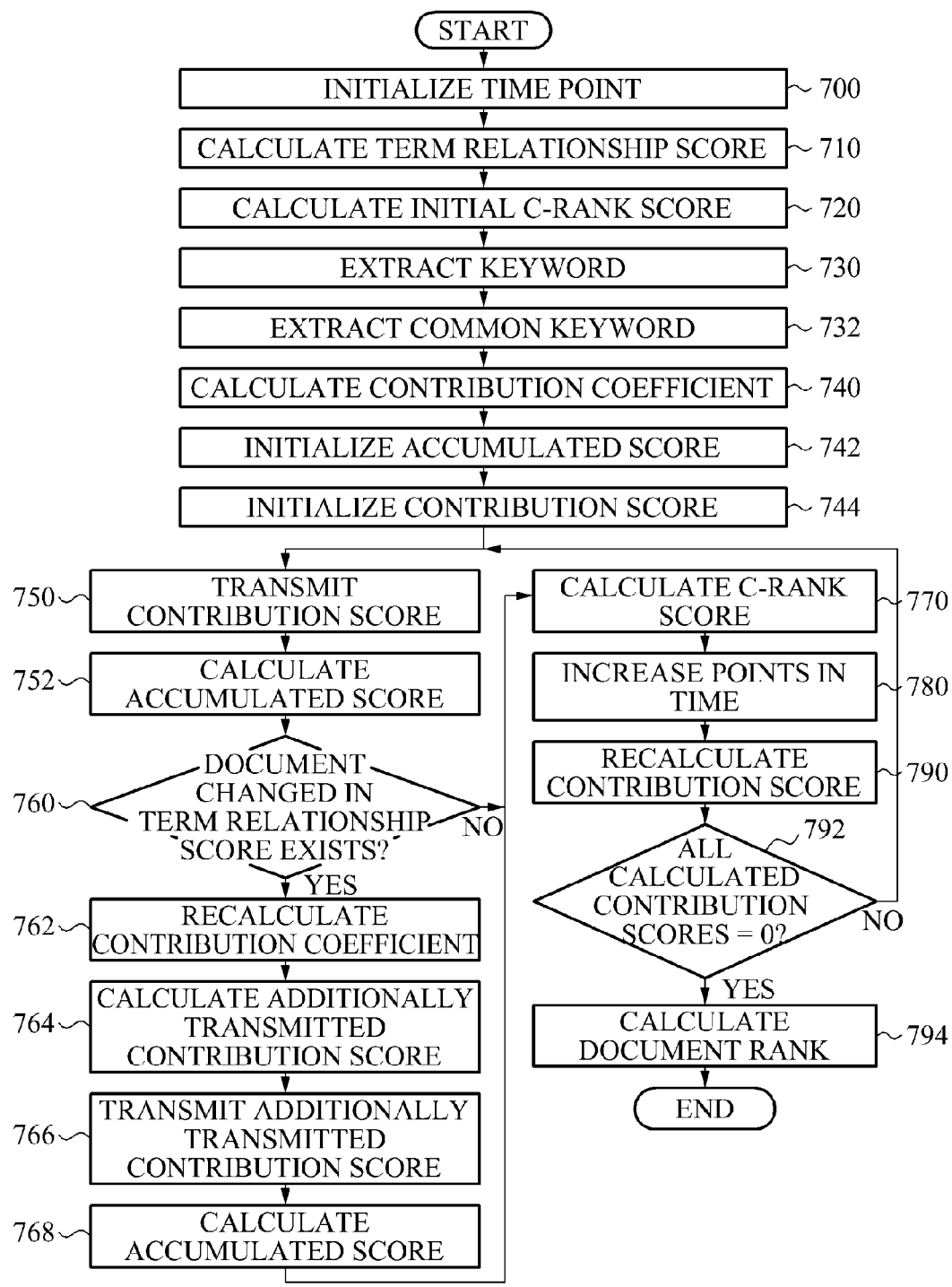
FIG. 7 is a flowchart illustrating a method for dynamically determining a document rank, according to exemplary embodiments of the present invention.

FIG. 7 is a flowchart illustrating a method for dynamically determining a document rank, according to exemplary embodiments of the present invention.

The dynamic document rank determining method may include preprocessing operations 700 to 744, repetition operations 750 to 792, and a document rank calculation operation 794.

In comparison to the dynamic document rank determining method of FIG. 3, the dynamic document rank determining method of FIG. 7 may further include a method for calculating a changed contribution score caused by addition, deletion, or a content change of a document, and a method for reflecting the changed contribution score to a document rank score.

First, the preprocessing operations 700 to 744 will be described.

In operation 700, time T may be initialized to zero.

In operation 710, the term relationship score of each document <p> with respect to the term "t" may be calculated. The term relationship score calculated in operation 710 will be referred to as a first term relationship score. For example, when a is first document contains a first term, the first term relationship score of the first document with respect to the first term is calculated.

In operation 720, an initial C-rank score of the document <p> with respect to the term "t" may be calculated and set. The initial C-rank score may be calculated by multiplying the term relationship score calculated in operation 710 by a weight $\lambda$.

In operation 730, a keyword may be extracted from the document <p>. The keyword is a part of the terms contained in the document <p>, such as the first term contained in the first document.

In operation 732, with respect to each link, a common keyword between two documents connected by a link may be extracted. Specifically, for example, when the first document includes a first link directed to a second document, a common keyword between the first document and the second document is extracted.

In operation 740, with respect to each common keyword between two documents connected by a link, a contribution coefficient between the two connected documents may be calculated. The calculated contribution coefficient may be considered a contribution coefficient with respect to the keyword of the link connecting the two documents. The contribution coefficient calculated in operation 740 will be referred to as a first contribution coefficient. For example, when there is a common keyword between the first document and the second document connected by a link, the first contribution coefficient with respect to the common keyword may be calculated.

In operation 742, an accumulated score $T_t(p,q)$ transmitted from the document <p> to the document <q> directed by the link may be initialized.

In operation 744, the contribution score $T_{t,0}(p,q)$ to be transmitted from is the computer or server hosting document <p> to the computer or server hosting document <q> associated with a link to document <p> may be initialized to $\alpha_{t,0}^1(q,p)R_t(p)$. The contribution score calculated in operation 744 will be referred to as the first contribution score. The first contribution score $\alpha_{t,0}^1(q,p)R_t(p)$ may be calculated based on a product of the first contribution coefficient calculated in operation 740 and the first term relationship score calculated in operation 710.

Next, the repetition operations 750 to 792 will be described. Operations 750 to 752 for transmitting the contribution score and operations 760 to 768 for additionally transmitting the contribution score may first be performed. Next, operations 770 to 792 for calculating the contribution score may be performed.

In operation 750, the contribution score $T_{t,T}(p,q)$ of the document <p> may be transmitted to the computer or server hosting document <q> associated with a link to document <p>.

The contribution score $T_{t,T}(p,q)$ may be transmitted only when the contribution score $T_{t,T}(p,q)$ is greater than a predetermined threshold value. Accordingly, the calculation quantity may be prevented from excessively increasing by continuous transmission of minor contribution scores through the link.

In addition, the contribution score $T_{t,T}(p,q)$ may be transmitted only when passed through a contribution path shorter than a maximum contribution path. Accordingly, the calculation quantity may be prevented from excessively increasing by repeated transmission of the contribution score along an extremely long path.

In operation 752, the contribution score $T_{t,T}(p,q)$ transmitted to each is computer or server hosting a document is added to the accumulated score $T_t(p,q)$. The contribution score of the first document is transmitted to the computer or server hosting the second document connected with the first document by the link, and then added to the accumulated score of the second document.

The operations 760 to 768 for additionally transmitting the contribution score may be performed when the additional contribution score occurs in at least one document. When the term relationship of the document is changed, the contribution score already transmitted may not accurately reflect the changed term relationship and the changed contribution coefficient. Accordingly, the additional contribution score may be transmitted to compensate for a difference in the contribution score generated by the change.

In operation 760, it may be determined whether any document changed in the term relationship exists. When no document changed in the term relationship exists, operation 770 may be performed.

The term relationship of the document may be changed by reasons 1) to 5) as follows.

1) A change in the contents of the document may change the term relationship. The term relationship score of the document before the change may be the first term relationship score calculated in operation 710. The term relationship score may be changed according to the changed contents.

2) Generation of a document or generation of the contents of the document may change the term relationship. The term relationship score before the is change may be zero. The term relationship score may be changed according to contents of the generated document or to the generated contents.

3) Deletion of a document or deletion of contents of the document may change the term relationship. The term relationship score before the change may be a first term relationship score calculated in operation 710. The term relationship score may become zero according to the deletion of the document or deletion of the contents of the document.

4) Generation of the link between two documents may be considered a change of the term relationship of the document. When the link from the first document to the second document is newly generated, the contribution score is additionally transmitted to the computer or server hosting second document, which is not transmitted with the contribution score. As the term relationship of the first document is considered to be changed, the term relationship score generated according to the change in the term relationship may be transmitted to the computer or server hosting the second document. The term relationship of the document may be unrelated to the links of the document. The first term relationship score calculated in operation 710 may be zero. In addition, the changed term relationship score may be considered the term relationship score with respect to the term contained in contents of the first document.

5) Deletion of the link between two documents may be considered a change of the term relationship of the document.

When the link from the first document to the second document is deleted, the contribution score already transmitted to the second document may need to be revised. When it is considered that the term relationship of the first document is changed, is a minus additional contribution score generated according to the change of the term relationship may be transmitted to the second document. The term relationship of the document may be unrelated to the links of the document. The first term relationship score calculated in operation 740 may be considered the term relationship score of with respect to the term contained in the contents of the first document. The changed term relationship score may be considered zero.

Hereinafter, the term relationship score of the changed document will be referred as a second term relationship score.

Operations 762 to 768 are performed with respect to the document <p> of which the term relationship is changed.

In operation 762, the contribution coefficient $\alpha_{t,T+1}^{1}(q,p)$ between the two documents <p> and <q> connected by the link may be calculated. The document <p> refers to a document including the link and whose term relationship is changed. The document <q> refers to a document connected with the document <p> through the link. The calculated contribution coefficient may be a contribution coefficient with respect to the keyword of document <p>. Hereinafter, the contribution score calculated in operation 762 will be referred to as the second contribution score.

In operation 764, the additional contribution score $\Delta T_{t,T}(p,q)$ is calculated according to Equation 6. Hereinafter, the additional contribution score calculated in operation 764 will be referred to as the second contribution score.

In operation 766, the additional contribution score $\Delta T_{t,T}(p,q)$ is transmitted from the computer or server hosting document <p> to the computer or server hosting document <q> associated with the link of the document <p>.

In operation 768, the additional contribution score $\Delta T_{t,T}(p,q)$ transmitted to the computer or server hosting document <q> is added to the accumulated score $T_t(p,q)$.

In operations 766 and 768, the additional contribution score of the first document, of which the term relationship score is changed, may be transmitted to the second document connected with the first document by the link, and then added to the accumulated score of the second document.

In operation 770, a product of (1−λ) and the score transmitted to the computer or server hosting document <p>, for example, the first contribution score, the second contribution score, and a third contribution score, which will be described later, may be added to the C-rank score of the document <p>. After the second document receives at least one of the first contribution score and the second contribution score from the first document, the contribution score calculated in operation 770 may be reflected in the document rank score of the second document.

In operation 780, time T may be increased by as much as 1. The contribution coefficient $\alpha_{t,T}^{1}(q,p)$ at time T may be designated as the contribution coefficient $\alpha_{t,T+1}^{1}(q,p)$ at time T+1.

In operation 790, the contribution score $T_{t,T}(p,q)$ may be recalculated and transmitted to the computer or server hosting document <q> from the computer or server hosting document <p>. The contribution score calculated in the present operation may be referred to as the third contribution score.

The third contribution score may be transmitted to the computer or server is hosting document <q> repeatedly by repeating operations 750 to 792 which may be performed at time T+1.

For example, when the third document and the first document are connected through a link from the third document to the first document, in other words, when the third document is a starting document of a path directed to the first document, the contribution score of the third document may be transmitted to the computer or server hosting the first document by operations 750 to 792. When operations 750 to 792 are subsequently repeatedly performed, the third contribution score generated based on the transmitted contribution score of the third document may be transmitted to the computer or server hosting the second document which may be connected with the first document. As a result, the third contribution score with respect to the third document may be calculated based on the contribution score of the first document passed through the path and based on the contribution coefficient.

In operation 792, it is checked whether all the calculated contribution scores are zero.

When all the calculated contribution scores are not zero, operations 750 to 792 are repeated.

When all the calculated contribution scores are zero, the repetition operations 750 to 792 are not repeated. Thereafter, operation 794 may be performed.

In operation 794, a rank of the document <p> with respect to the term "t" is calculated and determined based on the C-rank score $CR_t(p)$ of the document <p> with respect to the term "t".

After the C-rank score $CR_t(p)$ and the rank are determined, the term is relationship of a specific document may be changed. Operations 750 to 792 may be repeatedly performed to transmit the additional contribution score.

Figure 8:
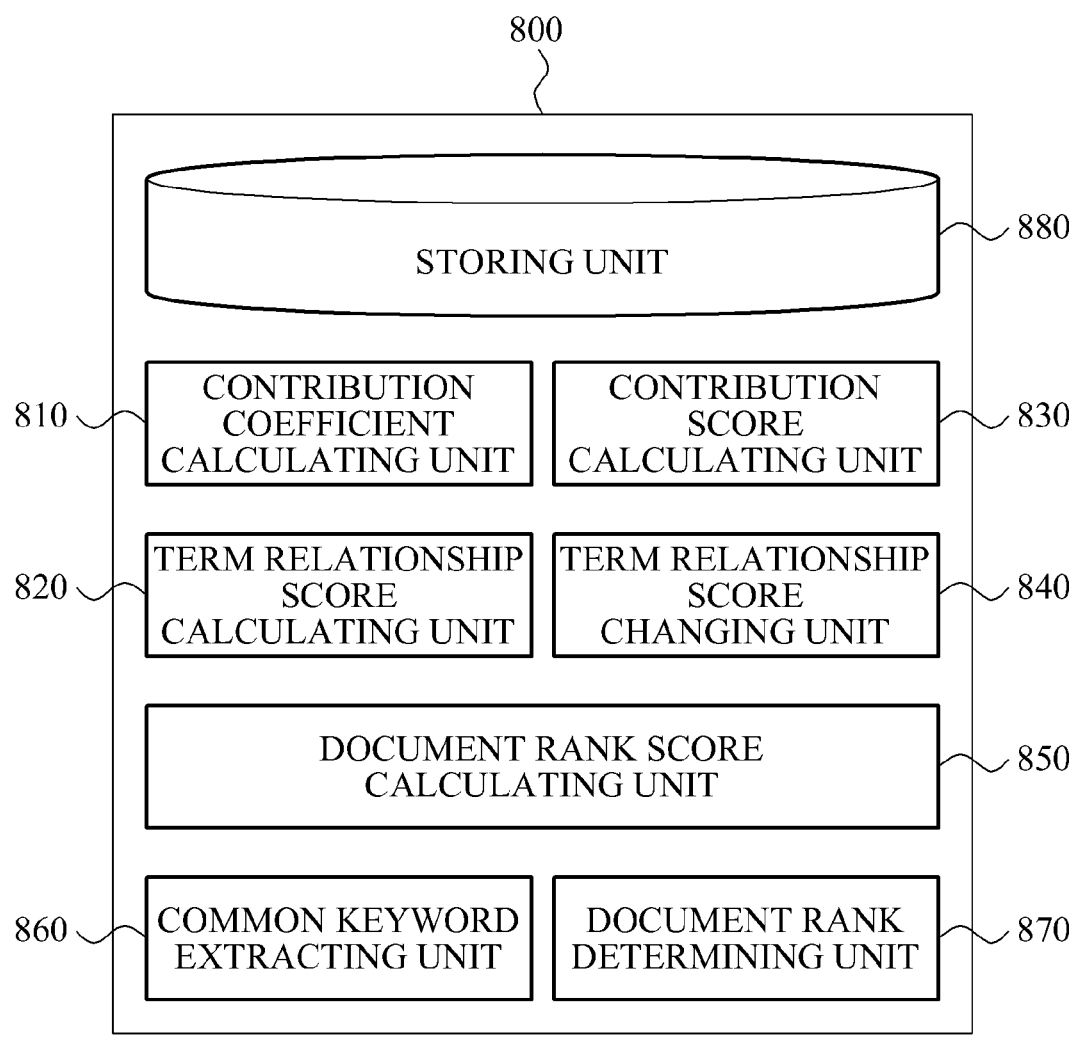
FIG. 8 is a diagram showing a structure of an apparatus for determining a document rank, according to exemplary embodiments of the present invention.

FIG. 8 is a diagram showing a structure of a document rank determining apparatus 800 according to exemplary embodiments of the present invention.

The document rank determining apparatus 800 may include a contribution coefficient calculating unit 810, a term relationship score calculating unit 820, a contribution score calculating unit 830, a term relationship score changing unit 840, and a document rank score calculating unit 850. The document rank determining apparatus 800 may further include a common keyword extracting unit 860, a document rank determining unit 870, and a storing unit 880.

The contribution coefficient calculating unit 810 may calculate a contribution coefficient according to the method(s) described hereinabove. For example, the contribution coefficient calculating unit 810 may calculate the first contribution coefficient in operation 740 and the second contribution coefficient in operation 762, as described with respect to FIG. 7.

The term relationship score calculating unit 820 may calculate a term relationship score according to the method(s) described hereinabove. For example, the term relationship score calculating unit 820 may calculate the first term relationship score in operation 710 and the second term relationship score in operation 760, as described with respect to FIG. 7.

The contribution score calculating unit 830 may calculate a contribution score according to the method(s) described hereinabove. For example, the contribution score calculating unit 830 may calculate the first contribution score in operation 744, the is second contribution score in operation 762, and the third contribution score in operation 790, as described with respect to FIG. 7.

The term relationship score changing unit 840 changes a term relationship score with respect to a term contained in a document. For example, the term relationship score changing unit 840 may change the first term relationship score to the second term relationship score, with respect to a document in which the term relationship is changed due to reasons 1) to 5) described with reference to operation 760.

The term relationship score changing unit 840 may request the term relationship score calculating unit 820 to recalculate the term relationship score with respect to a document of which the term relationship score is changed.

The document rank score calculating unit 850 may calculate a document rank score according to the method(s) described hereinabove.

The document rank score calculating unit 850 may calculate the document rank score of a second document based on a first term relationship score, and update the term relationship score of the second document based on the second term relationship score.

The document rank score calculating unit 850 may calculate the document rank score of the second document based on the first term relationship score according to the first contribution score as determined in operation 744 and the document rank score with respect to the common keyword of the second document. Also, the document rank score calculating unit 850 may update the document rank score of the second document based on the second term relationship score according to the second contribution score in operation 762 and the document rank score of the second document.

For example, the document rank score calculating unit 850 may calculate the document rank score in operation 770 based on the first contribution score in operation 744, the second contribution score in operation 762, and the third contribution score in operation 790, as described with respect to FIG. 7.

The document rank score calculating unit 850 may determine the document rank score with respect to the term of the document, based on the first term relationship score in operation 710, the first contribution score in operation 744, the second contribution score in operation 762, and the third contribution score in operation 790, as described with respect to FIG. 7.

The common keyword extracting unit 860 may extract a common keyword between two documents connected through the link. For example, the common keyword extracting unit 860 may extract a common keyword in operation 732 as described with respect to FIG. 7.

The document rank determining unit 870 may determine the document rank with respect to the term of the document, based on the document rank score with respect to the term of the document, and the document rank score calculated by the document rank score calculating unit 850.

The storing unit 880 may store and supply data necessary for operation of components 810 to 870 of the document rank determining apparatus 800. For example, the storing unit 880 may store a data structure for administration of the document, the link, the contribution coefficient, the contribution score, the term relationship score, the document rank score, and the document rank.

Since technological features of the exemplary embodiments described with reference to FIGS. 1 to 7 are also applicable to FIG. 8, a detailed description thereof will be omitted for conciseness.

Some or all of functions of the components 810 to 880 of the document rank determining apparatus 800 may be controlled by a controlling unit (not shown). The controlling unit may be a single processor or a multiprocessor, or a distributed processing system connected through a network (e.g., internet, web). In some cases, the components 810 to 880 may be implemented as a service, process, thread, module, library, or function performed by the controlling unit. In some cases, the controlling unit may include the document rank determining apparatus 800.

The exemplary embodiments according to the present invention may be recorded in computer-readable media including program instructions to implement various operations embodied by a computer. The media may also include, alone or in combination with the program instructions, data files, and data structures. The media and program instructions may be those specially designed and constructed for the purposes of exemplary embodiments of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), and flash memory. Examples of program instructions include both machine code, such as produced by a compiler, and files containing higher level code that may be executed by the computer using an interpreter. The described hardware devices may be configured to is act as one or more software modules in order to perform the operations of the above-described exemplary embodiments of the present invention. For example, the controlling unit may be a processor configured to execute instructions, that when executed, implement the service, process, thread, module, library, or function of components 810 to 880. Furthermore, the controlling unit may control one or more coupled or connected devices, such as, for example, an input unit or an output unit, to transceive documents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor to determine a document rank, comprising:
    calculating, using the processor, a document rank score of a second document based on a first term relationship score of a first document and a first contribution score, the first contribution score being determined based on a common keyword between the first document and the second document;
    changing the first term relationship score to a second term relationship score; and
    updating the document rank score of the second document based on the second term relationship score,
    wherein the first document is linked by a link to the second document,
    wherein the first term relationship score is determined based on content of the first document and the link, and
    wherein updating the document rank score comprises determining whether each of a plurality of contribution scores is greater than a predetermined threshold value, whereby if one of the contribution scores is less than or equal to the predetermined threshold value, that contribution score is set to a zero value.

2. The method of claim 1, wherein calculating the document rank score of the second document comprises calculating a first contribution score based on a first contribution coefficient with respect to the common keyword and the first term relationship score; and
    wherein updating the document rank score of the second document further comprises: calculating a second contribution coefficient with respect to the common keyword;
    calculating a second contribution score based on the first contribution coefficient, the first term relationship score, the second contribution coefficient, and the second term relationship score; and
    determining the document rank score of the second document according to the second contribution score.

3. The method of claim 1, wherein:
the first term relationship score is changed in response to a change associated with the content of the first document; and
the first term relationship score comprises a term relationship score with respect to the common keyword of the content before the change, and the second term relationship score comprises a term relationship score with respect to the common keyword of the content after the change.

4. The method of claim 1, wherein:
the first term relationship score is changed in response to changing the content associated with the first document; and
the second term relationship score is a term relationship score with respect to the common keyword of the changed content.

5. The method of claim 1, wherein:
the second term relationship score is a term relationship score with respect to the common keyword of the content of the first document.

6. The method of claim 1, wherein:
the first term relationship score is changed in response to deleting the link; and
the first term relationship score is a term relationship score with respect to the common keyword of the content of the first document.

7. The method of claim 1, wherein the first term relationship score and the second term relationship score are calculated based on a relationship between the content of the first document and the common keyword.

8. The method of claim 2, wherein each of the first contribution coefficient and the second contribution coefficient comprises a coefficient corresponding to a contribution by the second document to the content of the first document, with respect to the common keyword.

9. The method of claim 1, further comprising:
calculating term relationship scores for terms in the first document;
extracting keywords of the first document and keywords of the second document; and
extracting the common keyword between the first document and the second document.

10. The method of claim 2, further comprising:
calculating a third contribution score associated with a third document being a starting document of a path directed to the first document, the calculation of the third contribution score being based on at least one contribution score associated with the first document passed through the path and the first contribution coefficient.

11. The method of claim 10, wherein the document rank score of the second document is determined based on a term relationship score of the second document with respect to the common keyword, the first contribution score, the second contribution score, and the third contribution score.

12. The method of claim 1, further comprising:
determining a document rank of the second document based on the document rank score of the second document.

13. A non-transitory computer-readable recording medium storing a program that, when executed, causes a computer to implement a method, the method comprising:
calculating, using the computer, a document rank score of a second document based on a first term relationship score of a first document and a first contribution score, the first contribution score being determined based on a common keyword between the first document and the second document;
changing the first term relationship score to a second term relationship score; and
updating the document rank score of the second document based on the second term relationship score,
wherein the first document is linked by a link to the second document,
wherein the first term relationship score is determined based on content of the first document and the link, and
wherein updating the document rank score comprises determining whether each of a plurality of contribution scores is greater than a predetermined threshold value, whereby if one of the contribution scores is less than or equal to the predetermined threshold value, that contribution score is set to a zero value.

14. An apparatus to determine a document rank, the apparatus comprising:
a processor, a term relationship score calculating unit, a term relationship score changing unit, a contribution score calculating unit, and a document rank score calculating unit, the processor to control the term relationship score calculating unit, the term relationship score changing unit, the contribution score calculating unit, and the document rank score calculating unit,
wherein the term relationship score calculating unit is configured to calculate a first term relationship score of a first document and a second term relationship score, and
wherein the contribution score calculating unit is configured to calculate a first contribution score based on a common keyword between the first document and a second document, the second document being linked by a link to the first document,
wherein the term relationship score changing unit is configured to change the first term relationship score to the second term relationship score,
wherein the document rank score calculating unit is configured to calculate a document rank score of the second document based on the first term relationship score and the first contribution score, and to update the document rank score of the second document based on the second term relationship score,
wherein the first term relationship score is determined based on content of the first document and the link, and
wherein the processor is further configured to determine whether each of a plurality of contribution scores is greater than a predetermined threshold value to update the document rank score, whereby if one of the contribution scores is less than or equal to the predetermined threshold value, that contribution score is set to a zero value.

15. The apparatus of claim 14, further comprising:
a contribution coefficient calculating unit to calculate a first contribution coefficient and a second contribution coefficient based on the common keyword; and
a contribution score calculating unit to calculate the first contribution score based on the first contribution coefficient and the first term relationship score of the first document, and to calculate a second contribution score based on the first contribution coefficient, the first term relationship score, the second contribution coefficient, and the second term relationship score,
wherein the document rank score calculating unit is configured to calculate the document rank score of the second document based on the first term relationship score and the first contribution score with respect to the common keyword, and is configured to update the document rank score of the second document based on the second term relationship score and the second contribution score.

16. The apparatus of claim 14, wherein:
the term relationship score changing unit is configured to change the first term relationship score to the second term relationship score in response to a change in the content of the first document; and
the first term relationship score comprises a term relationship score with respect to the common keyword of the content before the chance and the second term relationship score comprises a term relationship score with respect to the common keyword of the content after the change.

17. The apparatus of claim 14, wherein:
the term relationship score changing unit is configured to change the first term relationship score to the second term relationship score in response to the content of the first document being changed; and
the second term relationship score comprises a term relationship score with respect to the common keyword of the changed content.

18. The apparatus of claim 14, wherein:
the second term relationship score comprises a term relationship score with respect to the common keyword of the content of the first document.

19. The apparatus of claim 14, wherein:
the term relationship score changing unit is configured to change the first term relationship score to the second term relationship score in response to deletion of the link; and
the first term relationship score comprises a term relationship score with respect to the common keyword of the content of the first document.

20. The apparatus of claim 14, further comprising:
a common keyword extracting unit to extract keywords of the first document and keywords of the second document, and to extract the common keyword between the first document and the second document,
wherein the term relationship score calculating unit is configured to calculate term relationship scores based on terms in the first document.

21. The apparatus of claim 15, wherein:
the contribution score calculating unit is configured to calculate a third contribution score associated with a third document being a starting document of a path directed to the first document, the calculation of the third contribution score being based on at least one contribution score associated with the first document passed through the path and the first contribution coefficient; and
the document rank score calculating unit is configured to determine the document rank score of the second document based, at least in part, on the third contribution score.

22. The apparatus of claim 21, wherein the document rank score calculating unit is configured to determine the document rank score of the second document based on a term relationship score of the second document with respect to the common keyword, the first contribution score, the second contribution score, and the third contribution score.

23. The apparatus of claim 14, further comprising a document rank determining unit to determine a document rank of the second document based on the document rank score.

* * * * *